United States Patent [19]
Vanaglash, Jr.

[11] 3,933,712

[45] Jan. 20, 1976

[54] NOVEL ENCAPSULATING MATERIAL AND METHOD

[75] Inventor: John J. Vanaglash, Jr., Tucson, Ariz.

[73] Assignee: Burr-Brown Research Corporation, Tucson, Ariz.

[22] Filed: Mar. 24, 1975

[21] Appl. No.: 561,209

Related U.S. Application Data

[63] Continuation-in-part of Ser. No. 465,316, April 29, 1974, abandoned.

[52] U.S. Cl.... 260/29.1 SB; 260/37 SB; 260/46.5 H
[51] Int. Cl.² ...................... C08L 83/04; C08J 3/00
[58] Field of Search .... 260/29.1 SB, 37 SB, 46.5 G, 260/46.5 H

[56] References Cited
UNITED STATES PATENTS

| | | | |
|---|---|---|---|
| 2,967,170 | 1/1961 | Merker | 260/46.5 H |
| 3,527,728 | 9/1970 | Gibbon et al. | 260/46.5 G X |
| 3,539,530 | 11/1970 | Karstedt | 260/46.5 G X |
| 3,814,723 | 6/1974 | Yokokawa et al. | 260/46.5 G X |

*Primary Examiner*—Lewis T. Jacobs
*Attorney, Agent, or Firm*—Cahill, Sutton & Thomas

[57] ABSTRACT

A novel encapsulating material and method of making said material is described wherein an organopolysiloxane polymer is mixed with a polydimethyl siloxane fluid diluent, a filler of hollow glass beads and a controlled amount of sodium in the form of sodium borate. A methyl hydrogen siloxane catalyst is added to the mixture and the material cured; the total amount of sodium present in the mixture and catalyst is maintained at approximately 180 ppm.

6 Claims, No Drawings

NOVEL ENCAPSULATING MATERIAL AND METHOD

This application is a continuation in part of application Ser. No. 465,316, filed Apr. 29, 1974, now abandoned.

The utilization of encapsulating materials or "potting" compounds in the electronics industry is well known; such materials or compounds in their cured state provide numerous advantages to the electrical components potted or encapsulated. Numerous systems are available in the prior art such as silicone rubber compounds, epoxy compounds, polyurethanes, vinyl polymers, acrylic polymers, and a variety of elastomers and syntactic foams. Each of these systems has specific advantages and disadvantages. It is also well known in the prior art that a variety of fillers can be utilized in the various systems to reduce the weight of the resulting cured material and generally to replace the relatively expensive constituents of the material with the inexpensive filler. In many applications, the filler will enhance the characteristics or properties of the material and may even provide certain characteristics that are required in a particular application.

In electronic applications, the encapsulating material must exhibit proper electrical characteristics and have acceptable resistivity, dielectric constant and dielectric absorption; further, the mechanical properties of the material may also be important such as the thermal coefficient of expansion, specific gravity, hardness and in some instances, tensile or shear strength. The thermal coefficient of expansion is particularly important when the encapsulated electrical component includes delicate electrical connections which can be broken or altered by the shifting of the encapsulating material during thermal expansion or contraction. Another property which the encapsulating material must exhibit prior to curing is the ability to flow into and around the components being encapsulated. This property is generally keyed to the material's viscosity; for example, in silicone polymer materials it is frequently desirable or necessary to add a non-reactive diluent to sufficiently reduce the viscosity of the uncured material. This lower viscosity permits the polymer to penetrate the interstices between electronic components and to appropriately conform to the shape of the encapsulated elements and the shape of the mold or shell utilized in the encapsulating process.

The addition of diluents, particularly in silicone polymer systems, is attended by possible serious side effects. For example, if the viscosity of the unpolymerized polymer must be reduced in a particular encapsulating application, and sufficient diluent is added to achieve this end, the resulting polymerized product after curing will frequently "bleed" and/or seriously lose some of its desirable characteristics. Indeed, excessive diluent may even result in a gelantinous mass completely unsuited mechanically or electrically to encapsulating techniques. In most silicone polymer systems, the addition of a non-reactive thinner is limited to approximately 10% by weight of the silicone polymer to which it is added.

The above-mentioned difficulties accompanying the utilization of silicone polymer encapsulating materials can become more acute in those instances where the encapsulating material is to be applied to sensitive electronic circuit devices such as integrated circuits; it is particularly true when the electrical properties of the encapsulating material affect low signal strengths usually present in such integrated circuits. The interaction of the electrical properties of the encapsulating material with such sensitive electronic systems places a much greater requirement for uniformity of the encapsulating material and for controllable desirable electrical characteristics of the material.

It is therefore an object of the present invention to provide a method for making a novel silicone polymer encapsulating material having desirable electrical and mechanical properties for encapsulating electronic components.

It is another object of the present invention to provide a method for making a novel silicone polymer encapsulating material wherein substantially more diluent may be added to the material during the process without deleteriously affecting the desirable properties of the polymerized material.

It is still another object of the present invention to provide a method for producing a novel silicone polymer encapsulating material wherein the sodium content of the unpolymerized mixture is controlled.

It is still another object of the present invention to provide a novel encapsulating material having desirable electrical and mechanical properties for use in the encapsulation of electronic components and integrated circuits.

These and other objects of the present invention will become more apparent to those skilled in the art as the description thereof proceeds.

A variety of organopolysiloxane systems are commercially available that may be utilized as the basis for the present invention. These polymer systems are generally an organopolysiloxane utilized with a methyl hydrogen siloxane catalyst. Thinners to be used with these polymers are usually a non-reactive polydimethyl siloxane fluid. Examples of such materials are General Electric's RTV silicone rubber compounds and specifically the compound designated by General Electric as "RTV-615", or "Sylgard 184" by Dow Chemical Corporation. Such compositions are described, for example, in U.S. Pat. Nos. 3,539,530 and 2,967,170.

Although the utilization of calcium carbonate, silica flour, glass fiber, or aluminum oxide as fillers are well known, small glass sphere fillers seem most appropriate. Such spheres are generally free-flowing, thin-walled, hollow glass or ceramic spheres approximately 10 to 300 microns in diameter.

Such spheres are typically made from a variety of glass compositions and can be made from sodium borosilicate glass, silica, insoluble glass compounds or ceramics. Such hollow spherical glass filler materials are commercially available under the trade names "Eccospheres" and "Microballoons" from the Emerson & Cuming Corporation; such fillers are also available from the Minnesota Mining & Manufacturing Company and are designated as glass bubbles with a type designation such as "B22A".

In practicing the present invention it is necessary to ascertain the amount of sodium present in the constituents to be used and to augment, if necessary, the amount by adding sodium in the form of anhydrous sodium borate powder ($Na_2B_4O_7 \cdot 10H_2O$). Sodium borate is commercially available from various sources such as Mellinckrodt Chemicals; it has been found that sodium borate in powdered form, preferably of an approximate particle size of 600 mesh has been found suitable. In the event that excessive sodium compound residues are found to exist (which may occur in the form of a thin powdered coating of sodium borate on the glass beads), it may be necessary to remove such excess sodium residues. However, fillers such as glass beads are commercially available with sufficiently low sodium borate residue thereon that removal of sodium residues should generally not be required.

The sodium residue (in the form of sodium borate) present in bulk quantities of fillers, such as glass beads mentioned above, can be determined in accordance with well known and established test procedures (for example, ASTMD 1067-68 Method A). The sodium content, which is in compound form, of the polymer catalyst and diluent can be determined by various acceptable techniques such as photospectometry. For example, samples of the polymer, the diluent and the catalyst are subjected to spectographical analysis using well known and established techniques to establish a value of the sodium content in each.

I have found that controlling the total sodium content, in sodium borate form, of the unpolymerized mixture of the polymer, diluent, filler and catalyst to approximately 3000 ppm by weight, or equivalent sodium content to approximately 200 ppm, produces unexpected results in the form of excellent electrical and mechanical properties of the polymerized encapsulated material while nevertheless permitting unusually high percentages of diluent (and therefore control of viscosity). Sodium content of silicone polymer mixtures, including fillers, diluents and catalysts, prepared in accordance with present day practices generally run in the range of 600 to 900 ppm although I have found some mixtures to be as low as 480 ppm and others to be as high as 1300 ppm. While the sodium content of the mixture was found to be ideal at approximately 180 ppm, decreasing or increasing the sodium content from this ideal was found to be accompanied by a deterioration in the mechanical and/or electrical properties of the system. I have found that sodium contents less than 30 ppm will result in a system with a very slow cure, mechanical characteristics that are not suitable and the polymerized material will be gelatinous. When the sodium content exceeds 300 ppm, the polymerized system may be well cured but the electrical resistivity falls to an unacceptable level and other electrical characteristics present a totally unacceptable system for electrical encapsulation. For extremely sensitive electronic components, limiting the sodium content of the mixture to the range of 100 ppm to 300 ppm provides a workaable range within which to tailor the resulting system to specific needs while nevertheless practicing the teachings of the present invention.

In practicing the present invention the polymer may be pretested utilizing various polymer/catalyst ratios to determine the best ratio to optimize the desired mechanical and electrical characteristics. This technique is frequently used and is generally recommended in most polymer systems; such pretesting usually determines the optimum polymer/catalyst ratio to compensate for variations in the characteristics of the polymer and catalyst from lot to lot as they are supplied from the supplier. For example, one convenient technique is to prepare samples utilizing various percentages by weight of catalyst. Specifically, in using the above mentioned General Electric silicone polymer system RTV-615, four samples of polymer (GE 615A) catalyzed using the supplied catalyst (GE 615B) were prepared using catalyst percentages of 8%, 9%, 10% and 11%. Each of the sample compounds is then utilized to encapsulate a capacitor constructed from one inch square metallic plates separated by a 1/10 inch square low dielectric constant dielectric material. The dielectric is 1/32 inch thick. Appropriate leads are connected to the capacitor plates; care must be exercised to ensure that all materials utilized in the construction of the capacitors, including the encapsulating spacers, are nonreactive with the encapsulating system (such as, for example, sulphur and/or nitrogen containing compounds). The encapsulated capacitors are then subjected to resistivity tests, capacitance tests (which are usually measured at 1 Khz) and are tested for dielectric absorption. These tests are conducted at a variety of temperatures and usually at at least three temperatures, namely, $-50°C$, $25°C$ and $125°C$. It has been found that generally the samples that exhibit the more desirable values of any one of the above electric characteristics will also exhibit more desirable values of all of the above electrical characteristics. It may therefore be possible to rely on the results obtained from only one of the above tests, preferably the test for resistivity.

Of the four test devices using the various polymer/catalyst ratios, the one exhibiting the best electric characteristics will then represent the ideal polymer/catalyst ratio for the particular batch of constituents.

To provide a suitable viscosity to the mixture of polymer filler and catalyst, a diluent may be added. The diluent, in the case of the General Electric RTV system is designated "RTV-910" and is a polydimethyl siloxane fluid. In silicone polymer systems, the utilization of a diluent must heretofore have been carefully controlled. Usually, the diluent was limited to approximately 5% by weight of the silicone polymer with an upper limit of approximately 10% diluent. I have found that with the method and encapsulating material of the present invention substantially more diluent than was thought possible may be added to the unpolymerized polymer. The ability to add the additional diluent permits the selection of viscosity to accommodate the end use of the unpolymerized mixture and ensure that the mixture will completely encapsulate the electronic components with which it is being used. Polymer to diluent ratios of approximately 1:1 by weight seem to be ideal; however, the system seems to operate satisfactorily using from 20% to 150% diluent or polymer diluent ratios of 1:0.2 to 1:1.5 by weight. It may be seen that this amount of diluent represents an increase of from 4 to 30 times the diluent heretofore recommended.

When utilizing glass spheres as the filler, the spheres may range in particle size from 10 – 300 microns; the distribution of particle size from batch to batch may vary. If they preponderence of glass beads' size is toward the smaller end of the distribution scale, the resulting encapsulating material incorporating those beads will have a tendency to be thin or non-viscous and difficult to handle during the encapsulating process. On the other hand, if the distribution of glass beads' size were near the larger end of the spectrum, the resulting encapsulating material would have a tendency to be thick or viscous and also difficult to handle during the encapsulating process. A procedure for grading or correcting for the variance in particle size distribution is therefore usually required prior to determining the actual weight or volume of the filler to be added to the polymer. When using glass beads or spheres as the filler, it is most convenient to work with weights although volumetric ratios would still produce proper proportions; however, using other more dense fillers, or mixtures of other fillers and glass spheres, volumetric ratios seem more appropriate. When using volume as a basis for determining mixture ratios, it has been found that a ratio of polymer to filler to approximately 1:1 is ideal.

To correct for the variance in particle size distribution, the specific gravity of the particular batch of glass beads to be used is determined, and that value is divided by the specific gravity of an ideal (theoretical uniform) batch of glass beads. The ratio of specific gravities therefore represents a correction factor which may be used to multiply the desired weight of filler to be mixed with the polymer. The weight ratio of polymer to glass beads, when using General Electric's organopolysiloxane, RTV-615 and when using 3-M's B22A glass beads, is found to be ideal at approximately 4:1; however, weight ratios as high as 5:1 and as low as 3:1 have been found satisfactory. As mentioned previously, in those instances where fillers other than glass beads are to be used, such as aluminum oxide, silica or calcium carbonate it has been found most convenient to determine the polymer/filler ratio on a volumetric basis. It has also been found that a volumetric ratio of 1:1 is appropriate when using such fillers.

EXAMPLE

Thirty-two pounds of organopolysiloxane polymer, namely, General Electric's RTV 615A was placed into a mixing barrel (the polymer was pretested as above described to ascertain the ideal polymer/catalyst ratio). The mixing barrel consisted of a cylindrical polypropylene drum with a stainless steel helical mixing screw therein, said screw mounted on a shaft affixed to one end of the cylindrical barrel. The barrel was mounted in a horizontal position and supported on driving wheels which, when operated, resulted in the continuous rotation of the barrel about its longitudinal axis; the helical screw member within the barrel aiding in the complete mixing and distributing of the contents therein.

To the polymer in the barrel was added thirty-two pounds of polydimethyl siloxane fluid thinner or diluent, namely, General Electric's RTV 910. Glass beads manufactured by 3-M under the type designation B22A were then weighed to provide a polymer to glass filler ratio of 4:1 (or 8 pounds of glass beads). The glass beads were previously found to have a specific gravity of approximately 0.110. The weight of correction factor thus applied to the eight pounds was the ratio of .110 to .104 (the nominal or ideal specific gravity of the beads) or 1.06. The amount of glass beads thus added was 8 times 1.06, or 8.48 pounds. The sodium borate content of the glass beads as determined by the procedure described above, added to the sodium content found to exist in the polymer catalyst and diluent by spectographic analysis was found to be approximately 60 ppm. Sufficient sodium was then added in the form of sodium borate to bring the total sodium content to the ideal level or approximately 180 ppm. The cover of the barrel was then sealed in place and the barrel rotated for approximately four hours to thoroughly mix the contents thereof. At the end of the mixing period, the mixture was a white milky substance having a viscosity of about that of a medium weight oil.

The contents of the mixing barrel were then transferred to an open stainless steel container where the proper amount of methyl hydrogen siloxane catalyst was added. The catalyst ratio determined in accordance with the procedures described above were found in this instance to be about 9% by weight of the polymer and therefore approximately 2.9 pounds of catalyst was added. The catalyst was stirred into the mixture being careful not to stir so vigorously as to crush the glass beads.

Several epoxy shells measuring approximately 2 in. × 2 inch × ½ inch deep were utilized as forms or shells to receive a 1/8"inch layer of the above mixed constituents. Electronic integrated circuit chips having connector pins extending from one surface thereof were then placed in the shells with the pins extending upwardly, were gently pressed onto the mixture, and a subsequent layer of the mixture was then poured on top of the circuit chips up to the top of the shells. The viscosity of the mixture was found to be ideally suited for conforming to both the configuration of the shell and to completely surrounding the components on the circuit chips as well as the connector pins extendng from the chips through the subsequent layer of mixture (to provide a means of connection to the circuit now embedded between the layers of the encapsulating mixture). In this particular application, an epoxy cap or header was then bonded across the open side of the shell to enclose the encapsulating mixture and circuit chips with the connector pins extending through the header. The encapsulated device was then placed in a preheated oven at a temperature of 85°C for six hours to effect a complete cure.

The mixture becomes compounded and is substantially cured within less than the above six hours; however, as in many cross-linking systems the completion of the cross-linking procedure can be assured by extending cure time. In practicing the method of the present invention, it has been found that occasional stirring of the mixture is necessary to prevent separation or striation of the various constituents in view of their varying densities; it has also been found that after dispensing the liquid mixture (such as by pouring in the above mentioned shells) it is desirable to effect the cure within approximately one-half hour to prevent such separation or striation of the constituents. It has also been found that the mixture may be cured at different temperatures and times without deleterious effects; for example, some electric components are extremely heat sensitive and it may be necessary to reduce the curing temperature to prevent damage to the electrical components. Reducing the curing temperature will, of course, increase the time required at that temperature for effecting a complete cure. It has been found, for example, that reducing the curing temperature to 65°C increases the desired time for the cure to approximately 16 hours.

I claim:

1. The method of making an encapsulating material comprising the steps:
    a. forming a mixture of organopolysiloxane polymer, a polydimethyl siloxane fluid diluent, sodium borate and a filler taken from the group consisting of:
        1. hollow glass beads,
        2. aluminum oxide,
        3. silica,
        4. calcium carbonate,
        5. glass fiber, said mixture having a polymer to diluent ratio of about 1:0.2 to 1:1.5 by weight and having a polymer to filler ratio of about 1:1 by volume;
   b. adding sufficient methyl hydrogen siloxane catalyst to substantially completely polymerize said polymer;
   c. controlling the amount of sodium in said mixture and catalyst to a total sodium content of from about 125 ppm to about 300 ppm by weight of the total mixture and catalyst; and
   d. curing said mixture for a time and at a temperature sufficient to substantially completely polymerize said polymer.

2. The method of making an encapsulating material comprising the steps:
   a. forming a mixture of silicone polymer, a polydimethyl siloxane fluid diluent, sodium borate and hollow glass beads, said mixture having a polymer to diluent ratio of about 1:0.2 to 1:1.5 by weight and having a polymer to glass bead ratio of about 5:1 to 3:1 by weight;
   b. adding sufficient methyl hydrogen siloxane catalyst to substantially completely polymerize said polymer;
   c. adding sodium borate to bring the amount of sodium in said mixture and catalyst to a total sodium content of from about 125 ppm to about 300 ppm by weight of the total mixture and catalyst; and
   d. curing said mixture for a time and at a temperature sufficient to substantially completely polymerize said polymer.

3. The method of making an encapsulating material comprising the steps:
   a. forming a mixture of organopolysiloxane, a polydimethyl siloxane fluid diluent, sodium borate and hollow glass beads, said mixture having a polymer to diluent ratio of about 1:0.2 to 1:1.5 by weight and having a polymer to glass bead ratio of about 5:1 to 3:1 by weight;
   b. adding sufficient methyl hydrogen siloxane catalyst to substantially completely polymerize said polymer;
   c. controlling the amount of sodium in said mixture and catalyst to a total sodium content of about 100 ppm to about 200 ppm by weight of the total mixture and catalyst; and
   d. curing said mixture for a time and at a temperature sufficient to substantially polymerize said polymer.

4. The method of making an encapsulating material comprising the steps:
   a. forming a mixture of organopolysiloxane, a polydimethyl siloxane fluid diluent, sodium borate and a filler of hollow spherical glass beads, said mixture having a polymer to diluent ratio of about 1:1 by weight and having a polymer to filler ratio of about 4:1 by weight;
   b. adding from approximately 8% to approximately 11% by weight a methyl hydrogen siloxane catalyst to said mixture;
   c. controlling the amount of sodium in said mixture and catalyst to a total sodium content of about 180 ppm by weight of the total mixture and catalyst; and
   d. curing said mixture for a time and at a temperature sufficient to substantially completely polymerize said polymer.

5. The novel encapsulating material produced by the method of claim 1.

6. A novel polymerized silicone encapsulating material having hollow glass beads therein and produced by the method of claim 2.

* * * * *